March 28, 1967 A. S. MENGEL 3,311,884

OSCILLATOR RING WITH RANDOM DIGIT SELECTION

Filed Sept. 30, 1963 2 Sheets-Sheet 1

ARNOLD S. MENGEL,
INVENTOR.

By His Attorneys
Spensley & Horn.

ARNOLD S. MENGEL,
INVENTOR
BY HIS ATTORNEYS
Spensley & Horn 3,311,884
Patented Mar. 28, 1967

3,311,884
OSCILLATOR RING WITH RANDOM DIGIT SELECTION

Arnold S. Mengel, 629 16th St., Santa Monica, Calif. 90402

Filed Sept. 30, 1963, Ser. No. 312,632
5 Claims. (Cl. 340—147)

ABSTRACT OF THE DISCLOSURE

A multi-branch electrical oscillator circuit having its circuit branches intercoupled in a regenerative ring, the circuit branches being periodically actuated from a first state to a second state in a continuous sequence. The signals generated by the circuit are representative of randomly selected digits from a sampling size determined by the number of circuit branches and an expected frequency distribution determined by the circuit constants of the branches.

The study of probability has developed from the consideration of two types of problems: those connected with games of chance and those connected with mortality and insurance. Among the former there are problems concerning the tossing of coins, and throwing of dice, the drawing of lottery tickets, and the like. Growing out of the latter there are problems connected with insurance, annuities and the statistical studies of physical, biological and social phenomena, etc. Approximate probability can be derived from experience by observing the results obtained upon repeated trials under similar circumstances. By assigning a number to each possible result under the given set of circumstances, repeated random selection of the numbers provides the statistical experience from which the probability of a given result can be estimated. Thus, the repeated random selection of numbers is useful in games, experimental probability studies and calculations, as well as in statistical exercises and demonstrations.

Since the utility of devices for the generation of random digits is primarily related to the study of probability, certain terminology in both the specification and claims is taken from that frequently employed in probability studies and is to be understood in that particular sense. For example, the term "sampling size," as utilized herein, refers to the number of possible results obtainable upon a single trial. The term "expected frequency distribution" herein refers to the expected relative frequency of occurrence of each particular result upon repeated trials. And, the term "digit" herein refers to a result having any specified significance, not necessarily numerical. Thus, the various digits comprising a sampling size could signify numbers, colors, objects, events or given circumstances, for example, including combinations of different types of results.

The concept of relative frequency comes into play when each of the possible results comprising a sampling size are not equally likely. For example, if a single ball is selected at random from a bag containing six red balls, three white balls and one black ball, the likelihood of selecting a red ball is much greater than the likelihood of selecting the black ball. Now if a statistical sampling is made by repeated trials, each trial being the random selection of a ball from the bag and replacing it, the relative frequency of selecting a ball of a certain color can be determined.

It has been found that by increasing the number of trials and calculating a new value of relative frequency after each trial, the sequence of relative frequencies approaches a limiting value which is the probability of obtaining a certain result in one trial. Thus, in the aforementioned example the relative frequency of red balls approaches $6/10$, and $6/10$ is said to be the probability of obtaining a red ball in one trial. Consequently, the expected frequency distribution is $6/10$ for red balls, $3/10$ for white balls and $1/10$ for the black ball.

Mechanical devices for the random selection of numbers, such as coins, dice, roulette wheels and spinner dials have long been in use, as has been drawing by lot. Limited tables of random numbers have been published, based upon individual random selections of digits or numbers. More recently, electronic circuitry such as random noise generators, for example, have been employed. However, at the present state of the art, electronic circuits for generating random numbers are relatively complex and expensive, and are of limited frequency distribution and sampling size. Furthermore, changing of the frequency distribution and sampling size in the present art circuitry usually involves complex switching arrangements or voltage calibrations. The present invention is directed toward a method and electronic circuitry which overcomes these disadvantages and limitations.

Accordingly, it is an object of the present invention to provide an improved technique for generating random digits.

Another object of the present invention is to provide improved electronic circuitry for generating random digits from various predetermined sampling sizes and expected frequency distributions.

Also, it is an object of the present invention to provide improved electronic circuitry for generating random digits, the circuitry being adapted for easily changing the expected frequency distribution.

A further object of the present invention is to provide relatively simple and inexpensive electronic circuitry for generating random digits.

A still further object of the present invention is to provide improved electronic circuitry for the generation of random digits, a separate readout being provided for each digit.

Yet another object of the present invention is to provide improved electronic circuitry for sequentially presenting a plurality of digital readouts in predetermined time relationship.

The typical present art approach to the electronic generation of random digits is to employ a generator of random electrical pulses and count the number of pulses generated during fixed time intervals. The circuitry used to perform this technique usually comprises a random pulse generator utilizing the so-called "shot effect" of a conducting vacuum tube, the generator output being fed through a gating circuit to a counter provided with a digital readout. Control of the gating circuit by a constant-frequency pulse generator provides the fixed time interval for the successive trials. Since pulses are actually random regenerated in this type of system, there is no control of the sampling size or of the expected frequency distribution. The present invention technique is directed toward the provision of simple electronic circuitry wherein the sampling size and expected frequency distribution are easily controlled and adjusted, thereby providing a significant increase in versatility.

Unlike the aforementioned general technique of counting the number of pulses randomly regenerated during a fixed time interval, the present invention technique involves the random interruption of a repetitive cycle of sequentially generated digits, the sequence being continuous, i.e., one digit is immediately followed by the next succeeding digit without any significant time lapse between the digits. Thus, read-out of the particular digit being generated upon interruption of the cycle provides the desired random result. The presently preferred electronic circuitry for performance of the present invention technique may be termed a "ring relaxation oscillator."

In a relaxation oscillator, the action is controlled by the charge or discharge of a capacitor (or inductance) through a resistance, the charging and discharging being initiated by operation of an electrical toggle. The term "electrical toggle," as utilized herein, refers to an electrical device which is characterized by a significant change in electrical conduction characteristics in response to predetermined changes in voltage or current applied to the device, the device thereby performing an electric switching function. For the purposes of this specification, these predetermined voltage or current changes are said to operate the toggle between "inactive" and "indicating" states. The toggles may be a single circuit element or may be formed of a combination of circuit elements.

The presently preferred random digit generator basic circuit is a type of relaxation oscillator formed by capacitively interconnecting a plurality of shunt-connected circuit branches into a regenerative ring, each of the circuit branches comprising the series combination of an electrical toggle and a resistance means. An electrical signal representative of a digit is generated by selectively operating the electrical toggle from its "inactive" state to its "indicating" state. The present inventor has discovered that when using electrical toggles of substantially identical electrical operating characteristic in this type of ring relaxation oscillator circuit, each circuit branch can provide the manifestation of a digital result having a relative frequency of occurrence determined by the value of the resistance means in that circuit branch with respect to the values of the resistance means in the other circuit branches. Thus a simple and inexpensive random digit generator can be constructed, the sampling size being easily changeable by the addition or subtraction of circuit branches, and the expected frequency distribution being readily determinable. In the hereinbelow illustrated embodiments the electrical toggles are cold-cathode gas discharge tubes, gas discharge tubes being presently preferred because their visible glow, when the tube is in the indicating state, provides a read-out without the necessity of additional circuitry. Particularly suitable gas discharge tubes are neon glow lamps and neon indicator tubes such as Nixies and Pixies.

In each circuit branch of the present invention ring relaxation oscillator, the electrical toggle is selectively switched between its inactive and indicating states by internally generated voltage pulses which are applied to the toggle through a coupling condenser, the voltage pulses applied to each electrical toggle being generated by switching of another one of the electrical toggles. The coupling condensers in combination with the resistance means in each of the circuit branches provide the desired relaxation effect, connection of the coupling condensers to the junction between the electrical toggles and the resistance means in each circuit branch intercoupling the circuit branches in a regenerative ring.

In the ring relaxation oscillator type of the present invention random digit generator circuit, the sampling size is determined by the number of circuit branches. Hence the sampling size is capable of easy adjustment merely by the addition or subtraction of circuit branches. The expected frequency distribution is determined by the values of the resistance means in each of the circuit branches, these resistance values determining the individual branch probabilities, i.e., the portion of each regenerative cycle during which a particular electrical toggle will be in the indicating state. Thus, any expected frequency distribution can be easily provided. The regenerative frequency of the generator is determined by the capacitance values of the coupling condensers which interconnect the circuit branches in a regenerative ring in conjunction with the lamp firing and maintaining voltages and the supply voltage.

To perform a trial (to randomly select a digit), the supply voltage is applied to the circuit and the repetitive cycle of sequentially generated digits is begun. Then, by selectively altering the voltage applied to the shunt-connected circuit branches, the regenerative cycle is halted and the circuit held in a stable condition wherein the particular electrical toggle which was in the indicating state when the regenerative cycle was stopped remains in that state, and all of the other electrical toggles are held in the inactive state. Determination of the particular electrical toggle in the indicating state provides the desired random result, the read-out in the illustrated embodiments being observation of the then-conducting gas discharge tube.

The novel features which are believed to be characteristic of the invention, both as to its organization and method of operation, together with further objects and advantages thereof, will be better understood from the following description considered in connection with the accompanying drawing in which presently preferred embodiments of the invention are illustrated by way of example. It is to be expressly understood, however, that the drawing is for the purpose of illustration and description only, and is not intended as a definition of the limits of the invention.

Although there are many types of circuitry suitable for performing the present invention technique of randomly interrupting a repetitive cycle of sequentially generated digits, the presently preferred circuitry is a type of relaxation oscillator formed by capacitively intercoupling a plurality of electrical toggles in a regenerative ring, actuation of one toggle causing the deactuation of the previously actuated toggle and perpetuating the relaxation effect. The electrical toggles are normally in their non-conducting state and are individually, sequentially operated to their conducting state for the generation of digits. In each of the illustrated embodiments, gas discharge tubes are used as the electrical toggles, the D.C. voltage supplied to the circuit being greater than the firing potential of the gas tubes. However, the periodic charge and discharge current of the coupling capacitors flow through the resistance means in the various circuit branches to cause variations in the voltage drop across the resistance means, thereby resulting in variations in the voltages applied across the gas tubes in such a manner as to operate the gas tubes between their inactive and indicating states in a repetitive cycle. The repetitive cycle of sequential toggle operation may be stopped for sampling by reducing the voltage across all of the gas tubes to their operating or maintaining voltage, which is a voltage less than their firing voltage. Consequently, only the gas discharge tube which was glowing at the particular time the cycle was halted will remain in its conducting state. Various circuits for so reducing the applied voltage will be shown hereinbelow.

Figure 1:
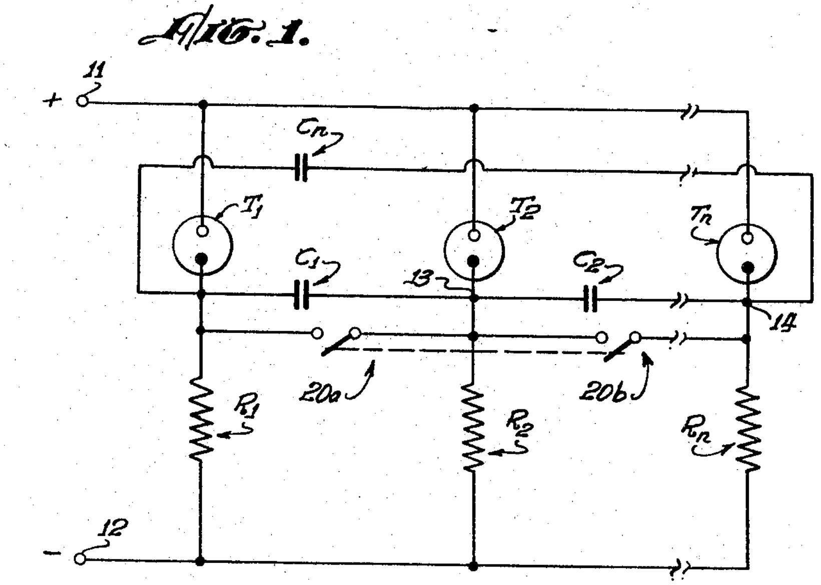
FIGURE 1 is a schematic diagram showing a basic embodiment of the ring relaxation oscillator type of present invention random digit generator circuit.

Turning now to the drawing, in FIGURE 1 there is shown the schematic diagram of a basic ring relaxation oscillator type of random number generator circuit in accordance with the present invention concepts. The form of the generator is basically a plurality of circuit branches connected in shunt across a source of D.C. operating potential applied to supply terminals 11 and 12. Each circuit branch consists of a gas discharge tube (T) and a load resistance (R). The components in the first circuit branch are identified by the numerical subscript 1, the components of the second circuit branch being identified by the numerical subscript 2, and so forth, the components of the *n*th circuit branch being identified by the subscript *n*. Thus, as indicated by the break line in the diagram of FIGURE 1 as many circuit branches as desired may be connected in shunt, the actual number being dependent upon the particular sampling size chosen.

Each circuit branch is capacitatively coupled to the next succeeding circuit branch, the coupling capacitors being connected to the junction between the gas discharge tube and the resistance means of each circuit branch. Thus, in the diagram of FIGURE 1 a capacitor $C_1$ intercouples the first and second circuit branches, a capacitor $C_2$ intercoupling the second and third circuit branches, and so forth, a capacitor $C_n$ interconnecting the *n*th circuit branch with the first circuit branch. The capacitor $C_n$ could be omitted, without influencing probabilities, if symmetrical operation is not required.

The gas discharge tubes illustrated for use as the electrical toggles in this circuit possess a negative resistance characteristic such that an increase in current flow through the tube results in a decrease in the voltage drop across the tube. In order to switch one of these tubes from its non-conducting state to its conducting state, a relatively high potential is applied across the tube, the potential at least equaling the tube firing potential. Upon ionization, the heavy flow of current through the tube results in a reduced voltage drop across the tube, the voltage drop across the conducting tube being termed its "operating" or "maintaining" potential. Thus, the D.C. voltage applied to the supply terminals 11 and 12 is in excess of firing potential of the gas discharge tubes utilized in the circuit. The resistance of the resistor used in each circuit branch is such that the voltage drop across it, when its associated tube is conducting, is less than the difference between the tube firing and operating potentials. The gas tubes chosen for use in the present invention circuitry should be aged and then matched as to their firing potentials and operating potentials to ensure accuracy in the generation of the expected probabilities.

The operation of relaxation oscillator circuits is known in the art and hence will be only briefly explained. Since none of the circuit branches are exactly identical, due to variations in production tolerances in resistors and in the characteristics of supposedly identical gas tubes, one of the gas tubes will fire before the others upon application of a suitable D.C. voltage to the supply terminals, assuming that all of the condensers in the circuit are completely discharged upon application of the D.C. voltage. For the purposes of explanation, let us say that the tube $T_2$ fires, that the generator circuit of FIGURE 1 has three circuit branches ($n=3$), and that identical gas tubes, resistors and capacitors are utilized throughout (within normal production tolerances).

Immediately upon the firing of the tube $T_2$ a heavy flow of current through the tube and the resistor $R_2$ will result, the flow of current through the resistor $R_2$ resulting in a voltage drop equal to the difference between the applied voltage and the operating voltage of the tube $T_2$. Thus, the junction between the tube $T_2$ and the resistor $R_2$ (indicated in FIGURE 1 by the reference numeral 13) will suddenly jump from zero up to a certain potential. Since the capacitors $C_1$, $C_2$ and $C_n$ cannot instantaneously charge, the potential appearing at the junction point 13 will be coupled to the similar junction point in each of the circuit branches by the coupling capacitors, thereby preventing any of the other tubes from firing since all of the tubes are then supplied with their operating potential which is lower than their firing potential.

Since the junction point 13 is now at an elevated potential the capacitor $C_1$ will begin to charge through the R-C circuit comprising the capacitor $C_1$ and the resistor $R_1$. Similarly the capacitor $C_2$ will begin to charge through the R-C circuit formed by the capacitor $C_2$ and the resistor $R_n$, these R-C circuits being provided with their charging currents through the conducting tube $T_2$. At the instant of firing of the tube $T_2$ the voltage drops across the resistors $R_1$ and $R_n$ will be equal to that appearing across the resistor $R_2$, but, as the associated coupling capacitors begin to charge the potential drops across the resistors $R_1$ and $R_n$ will decrease at an exponential rate in accordance with the buildup of the charge on the associated coupling capacitors. Eventually, at a time determined by the R-C time constant of its associated components, the potential drop across one of the resistors $R_1$ or $R_n$ will be reduced to a point at which a potential equal to the gas tube firing potential will appear across the associated gas tube of that particular circuit branch. Again, since the resistors, capacitors and gas tubes are not exactly identical, one of the tubes will tend to fire before the other. Let us say for example that the tube $T_n$ fires.

Immediately upon firing of the tube $T_n$ the resulting heavy flow of current through that tube will immediately raise the potential drop across the resistor $R_n$ and this potential drop, when added to the charge appearing across the capacitor $C_2$ at that instant of time, will effectively raise the potential of the junction point 13 to a value which is insufficient to support continued conduction of the tube $T_2$. In other words, since the potential at the junction point 13 is raised, the voltage applied across the tube $T_2$ is lowered below the extinction voltage and the tube is extinguished. Thus, the relaxation effect provided by the R-C regenerative coupling causes the extinguishment of the tube $T_2$ and the firing of the tube $T_n$.

Upon firing of the tube $T_n$ and the resulting rise in potential appearing at the junction point 14, the effect of this rise in potential will be immediately coupled to all of the circuit branches since the various charges on the coupling capacitors cannot instantaneously change. At that instant of time, the coupling capacitor $C_2$ has the greatest charge (which caused the tube $T_n$ to fire rather than the tube $T_1$), the coupling capacitor $C_1$ having a significantly greater charge than that of the capacitor $C_n$ since the potentials at both ends of the capacitor $C_n$ had been exponentially varying in the same direction and at fairly similar rates.

The charge on the capacitor $C_2$ at this instant of time is polarized such that it will add to the voltage drop appearing across the resistor $R_n$ to thereby raise the potential of the junction point 13 and extinguish the tube $T_2$. The capacitors $C_1$ and $C_2$ will then begin to discharge through the resistor $R_2$ while the capacitor $C_n$ begins to charge through the resistor $R_1$, the charging current now flowing through the tube $T_n$. Discharge of the capacitors $C_1$ and $C_2$ through the resistor $R_2$ tends to maintain a potential drop across it of a value higher than the exponentially decreasing voltage drop across the resistor $R_1$, the voltage drop across the resistor $R_1$ decreasing in accordance with the charging of the capacitor $C_n$. The build-up of the charge on the capacitor $C_n$ will lower the voltage drop appearing across the resistor $R_1$ eventually to the point where the potential appearing across the tube $T_1$ equals its firing potential, where upon the tube $T_1$ will fire. Immediately upon firing of the tube $T_1$, the increased current flow through the resistor $R_1$ will result in an increased potential drop across this resistor, this potential drop being coupled to the junction point 14 to cause extinguishment of the tube $T_n$. Thus, the circuit is a regenerative ring which forms a type of relaxation oscillator. Each time the oscillator is turned on a stable firing sequence will be established, although one cannot predict the firing pattern or which tube will fire first. However, this inherent characteristic is of no consequence when the circuit is used for the present invention purposes.

The present inventor has discovered that the hereinabove described ring relaxation oscillator circuit may be adapted for use as a random digit generator in which the sampling size and expected frequency distribution are conveniently controllable. In the circuit of FIGURE 1, the probability of the gas tube $T_1$ being in a conducting state at any arbitrary instant of time is:

$$P_1 \approx \frac{1/R_1}{1/R_1 + 1/R_2 + \cdots 1/R_n} = \frac{G_1}{G_1 + G_2 + \cdots G_n}$$

where G equals $1/R$=conductance, and P equals probability. Stated differently, $P_1R_1$=a constant. Thus, when using the coupling capacitors of similar capacitance values and gas tubes of similar firing potentials and operating potentials, the percentage of the regenerative cycle curing which the gas tube in each circuit branch will be in its conducting state is determined by the resistance of the resistor in that circuit branch. For example, if the resistance values of the resistors $R_1$, $R_2$ and $R_n$ are equal, there is an equal probability that any one of the tubes will be in a conducting state at any arbitrarily chosen instant of time. It is therefore readily seen that the expected frequency distribution can be varied merely by alteration of the resistors in the various circuit branches.

Referring back to the previous example wherein a bag contains six red balls, three white balls and one black ball, the sampling size equals three and the expected frequency distribution is $6/10$ for red balls, $3/10$ for white balls and $1/10$ for the black ball. This statistical situation can be simulated by the circuit of FIGURE 1 by utilizing three circuit branches, each circuit branch providing the manifestation of a different result. For example let the first circuit branch be a manifestation of the six red balls, the second circuit branch being a manifestation of the three white balls and the third circuit branch being a manifestation of the one black ball. From the hereinabove presented relationship it is seen that the resistor $R_2$ must be $1/3$ of the resistance of the resistor $R_n$, and the resistor $R_1$ must be $1/6$ of the resistance of the resistor $R_n$, remembering that the resistance values of these resistors must be within the range such that the voltage drop across any one of the resistors, when its associated tube is conducting, is less than the difference between the tube firing and operating potentials.

In order to halt the regenerative cycle at any arbitrary instant of time, a multi-ganged switch 20, having switch sections 20*a* and 20*b* is provided in the circuit of FIGURE 1. The number of gangs on the switch 20 is determined by the sampling size, the number of gangs being equal to $n$–1. Thus, in the illustrated embodiment of FIGURE 1 under the assumed condition that three different read-outs are possible ($n=3$), the switch 20 has two gangs.

Closing of the switch 20 effectively short-circuits all of the coupling capacitors and results in the application of an identical voltage across all of the gas tubes in the circuit, this voltage being equal to the tube maintaining voltage, and so being sufficient to keep the then-conducting tube in its conducting state to provide the visual indication of the randomly selected result. Subsequent opening of the switch 20 will resume the regenerative cycling of the circuit.

Figure 2:
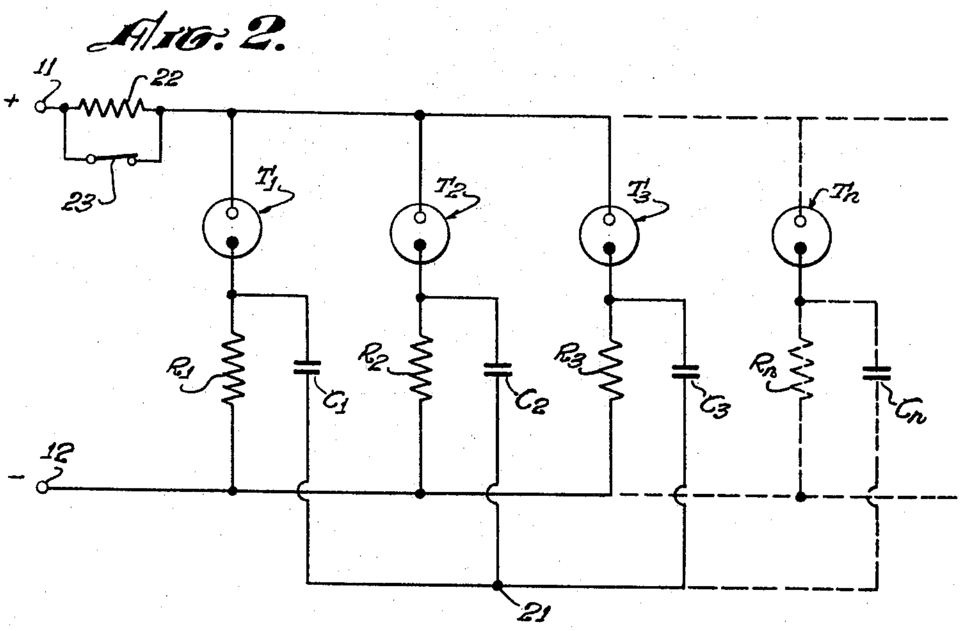
FIGURE 2 is a schematic diagram showing an alternative embodiment of the ring relaxation oscillator type of present invention random digit generator circuit.

In FIGURE 2 of the drawings there is shown a simplified version of the circuit of FIGURE 1 with like reference characters referring to like parts throughout. In the circuit of FIGURE 2, sampling is conducted by reducing the voltage applied to the shunt-connected circuit branches forming the regenerative ring, thereby eliminating the necessity of a multi-ganged switch and facilitating easier alteration of the sampling size. As in the circuit of FIGURE 1, one end of each of the coupling capacitors is coupled to the junction between the gas discharge tube and the resistor of one of the circuit branches; however, in the circuit of FIGURE 2, the other end of the coupling capacitors are interconnected at a common junction point 21. The junction point 21 normally remains floating, as shown, unless electrolytic capacitors are used or there is a great variation in the resistance values between $R_1$, $R_2$, etc. (as determined by the chosen frequency distribution) in which case a stabilizing resistor of relatively high resistance value is preferably connected between the junction point 21 and one of the supply terminals.

Interposed between the supply terminal 11 and the shunt-connected circuit branches is a voltage-dropping resistor 22 shunted by a single-pole, single-throw switch 23. The switch 23 can be of the normally-closed momentary pushbutton type which is depressed for sampling purposes. Thus, the resistor 22 is normally short-circuited and the circuit of FIGURE 2 normally functions as a relaxation type oscillator due to the regenerative ring coupling of the shunt-connected circuit branches, the operation being somewhat similar to that explained hereinabove with reference to FIGURE 1. To conduct a sampling trial, the regenerative cycle is interrupted by opening the switch 23, thereby inserting the voltage-dropping resistor 22 into the circuit to reduce the voltage supplied to the shunt-connected circuit branches below the firing potential of the gas tubes, this reduced voltage still enabling continued ionization of the then-conducting gas tube. The minimum resistance value of the voltage-dropping resistor 22 is dependent upon the resistance of the resistor in the circuit branch having the lowest probability, i.e., the largest resistor in the series $R_1, R_2 \ldots R_n$, in accordance with the following relationship:

$$R_{22} > \left(\frac{V_S - V_F}{V_F - V_M}\right) R_m$$

where:

$R_{22}$=resistance of the voltage-dropping resistor 22
$R_m$=resistance of the largest resistor in the series $R_1, R_2 \ldots R_n$
$V_S$=supply voltage
$V_F$=tube firing voltage
$V_M$=tube maintaining voltage The resistance value of the resistor 22 should be as low as possible, while still maintaining a reasonable safety factor, to allow for normal variations in supply voltage, etc., in order that the neon lamps will glow brightly.

A practical example of the construction of the circuit of FIGURE 2 will now be given. To enable operation from the readily available 110-volt A.C. source, a D.C. operating voltage on the order of 160 volts will be specified, this being the approximate voltage obtainable through the use of a simple half-wave rectifier and filter capacitor combination. The gas discharge tubes specified are miniature neon bulbs designated as NE–96. This type of neon bulb is particularly suited for use in the present invention circuitry due to the great difference between its firing and operating potentials, this tube firing at about 140 volts D.C. and operating at about 50 volts D.C. Thus, the gas tubes $T_1$–$T_n$ are of the NE–96 type. In any event, when individual gas tubes are chosen for use in the present invention circuitry (as opposed to a Nixie tube, for example), they should be aged and then matched as to their firing potentials and operating potentials to ensure accuracy in the generation of the expected probabilities. In the case where equal probabilities are desired for each possible result, the resistors $R_2$–$R_n$ will be all of equal resistance values. In this illustrative example, the resistors $R_1$–$R_n$ are 100,000 ohms, and the capacitors $C_1$–$C_n$ are 0.1 microfarad. One-half watt resistors and 100 working-volt D.C. capacitors will suffice. The voltage-dropping resistor 23 has a value on the order of 100,000 ohms.

With the circuit fabricated in accordance with these constants, a complete regenerative cycle will take about 1/50 second. Although not critical, the regenerative frequency should be high enough so that many regenerative cycles occur between each random trial in order to minimize correlation between successive samplings. For example, if a sampling is taken by manual opening of the switch 22, the regenerative cycle should be rapid enough so that the operator cannot coordinate his movements to enable the cycle to be stopped at a given point upon observation of the flickering gas tubes. Thus, for manual operation, the regenerative cycle frequency should not be less than several cycles per second.

To modify the circuit for unequal probabilities, a desired frequency distribution can be programmed by proper selection of the resistance value for each of the circuit branches in accordance with the hereinbefore presented mathematical probability relationships. In the cases where significantly unequal probabilities are selected, thereby resulting in significant differences in the values of the various resistors $R_1$–$R_n$, the value of the voltage-dropping resistor 23 should be reduced to about 5,600 ohms and a stabilizing resistor of about 22,000 ohms should be connected between the junction point 21 and the supply terminal 12, these two resistors then providing a voltage dividing effect which stabilizes circuit operation.

The voltage applied to the circuit must not exceed a certain maximum value in order for the circuit to oscillate properly, the maximum value depending upon the values of the resistors and capacitors in the circuit. In those instances where the supply voltage is excessive, an additional voltage-dropping resistor may be utilized, such as between the supply terminal 11 and the dropping resistor 22-switch 23 combination, for example.

A study of the circuit of FIGURE 2 will reveal that slight circuit modifications can be made to adjust the probabilities of the various circuit branches. For example, utilization of a resistor connected in shunt with one of the coupling capacitors will result in a change in probability. Also, return of the junction point 21 directly to the negative supply terminal 12 would permit the capacitors to control the probability and give equally bright output for each lamp, and also permit the use of electrolytic capacitors. In such case, the aforementioned additional voltage-dropping resistor should be used, its value being large enough to permit only one tube to fire at a time. The series combination of the additional voltage-dropping resistor and the resistor 22 should then be large enough to maintain the voltage across the tubes below the tube firing potential, when the switch 23 is opened to conduct a sampling trial. The individual circuit branch resistances must be of the proper size to keep the gas tubes within the negative resistance regions when they are in their indicating state, it being desirable to keep the resistance values low in order to ensure adequate lamp brightness.

Figure 3:
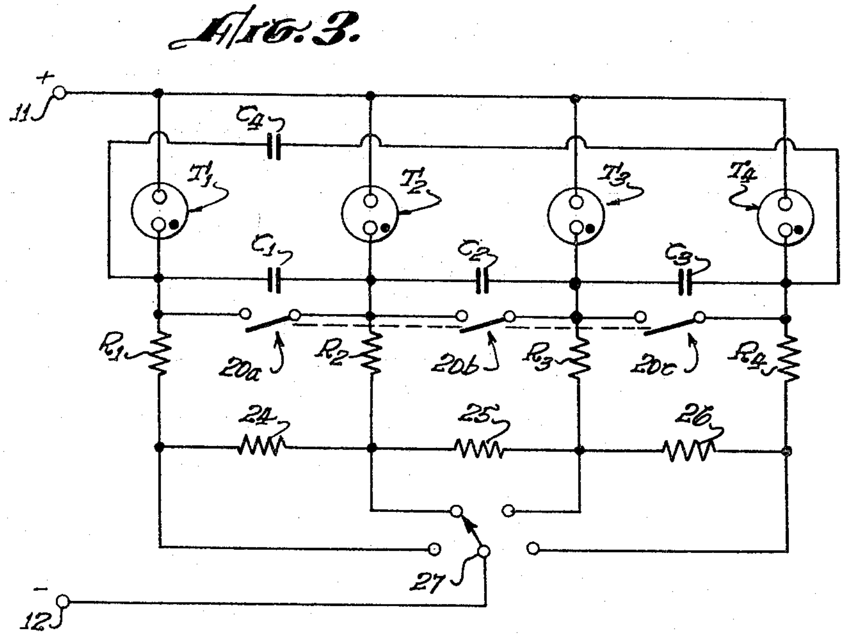
FIGURE 3 is a schematic diagram of a ring relaxation oscillator type of random digit generator circuit in which the peak of the distribution function is variable; and, FIGURE 4 is a schematic diagram showing a ring relaxation oscillator type of random digit generator circuit in which the mean value of the distribution function is variable.

In FIGURE 3 of the drawings, there is shown the schematic diagram of a ring relaxation oscillator type of present invention random digit generator circuit modified to permit shifting of the mean value of the distribution. The circuit of FIGURE 3 is shown to have four circuit branches to provide four possible results, although any number of circuit branches can be utilized, as indicated in FIGURE 1. In the 4-branch circuit of FIGURE 3, the negative supply terminal 12 is connected to the movable arm of a 4-position switch 27, one each of the four switch positions being connected to the resistor in a different one of the circuit branches. A resistor 24 is connected between the resistors $R_1$ and $R_2$, the resistor 25 being connected between the resistors $R_2$ and $R_3$, and a resistor 26 being connected between the resistors $R_3$ and $R_4$. Thus, by means of the switch 27, the negative supply terminal 12 can be connected to various points of the circuit, rotation of the switch 27 altering the effective resistances of each of the circuit branches to thereby vary the relative probabilities of the possible results and so alter the distribution. For example, with the switch 27 in the position shown in FIGURE 3, the resistance means of the first circuit branch comprises the series combination of the resistors $R_1$ and 24. Thus, it is seen that rotation of the switch 27 in a counterclockwise direction from the illustrated position will reduce the resistance value of the first circuit branch to the value $R_1$, thereby increasing the probability that the gas tube $T_1$ will be in its conducting state upon random interruption of the regenerative cycle. With the switch 27 in the position shown in FIGURE 3, the resistance means of the second circuit branch (that containing the gas tube $T_2$) comprises the resistor $R_2$, and the resistance means of the third circuit branch comprises the series combination of the resistors $R_3$ and 25. The resistance means of the fourth circuit branch, with the switch 27 in the position shown in FIGURE 3, comprises the series combination of the resistors $R_4$, 26 and 25.

With the switch 27 in the position shown in the circuit of FIGURE 3, the following relationships are established:

$$P_2R_2=(R_1+R_{24})P_1$$

$$P_3R_3=P_2R_2-R_{25}(1-P_1-P_2)$$

$$P_3R_3=P_4(R_4+R_{26})$$

$$P_1+P_2+P_3+P_4=1$$

In the case where all of the resistors are of equal value, the relative probabilities are as follows:

$P_1=5/21$
$P_2=10/21$
$P_3=4/21$
$P_4=2/21$

By similar circuit analysis, the probability relationships for other switch positions can be formulated.

Figure 4:
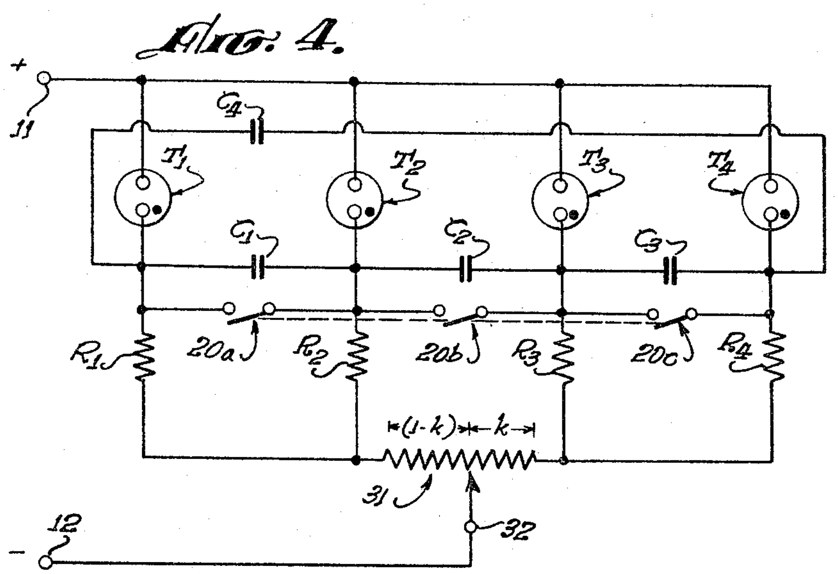

Turning now to FIGURE 4 of the drawing, there is shown a schematic diagram illustrating an adaption of the basic ring relaxation oscillator type of present invention random digit generator circuit for continuously varying the distribution function by shifting its mean value. In the circuit of FIGURE 4, the negative supply terminal 12 is coupled to the movable arm 32 of a variable resistor 31, the resistor 31 being connected between the resistors $R_2$ and $R_3$, as shown. Movement of the arm 32 of the resistor 31 provides continuous shifting of the mean value of the distribution function in a manner now to be explained for the illustrated example. Assume that the coupling capacitors $C_1$–$C_4$ are all of equal value and that $R_1=R_4$, and $R_2=R_3$. The variable resistor 31 is selected to have a maximum resistance equal to the resistance of the parallel combination of $R_1$ and $R_2$, i.e., the maximum resistance of the resistor 31 is equal to the product $R_1R_2$ divided by the sum $(R_1+R_2)$.

Utilizing the reference notation $k$ to indicate that portion of the total resistance of the resistor 31 to the right of the movable tap 32, and the reference notation $(1-k)$ to indicate that portion of the total resistance of the resistor 31 appearing to the left of the movable tap 32, the relative probabilities for the various possible results are as follows, with the numerical subscripts again identifying the particular circuit branches.

$$P_2=\frac{R_1}{R_2}P_1,\quad P_3=\frac{(2-k)\frac{R_1}{R_2}P_1}{1+k},\quad P_4=\frac{2-k}{1+k}P_1$$

The potentiometer 31 can be calibrated in terms of percentage of total resistance, or directly in terms of $P_3$ or $P_4$ for given values of $P_1$ and $P_2$, to facilitate selective adjustment of the mean value of the distribution function.

The several advantages of neon glow lamps as the toggle elements in the illustrated embodiments have been mentioned. However, a disadvantage of the neon glow lamps is that their characteristics change during life. Aging, before matching and selection, together with the use of the more stable lamp types, such as NE-23 and NE-76, will minimize this effect. When using the NE-96 and NE–97 types of neon lamps, the lamps should be operated near their rated power to minimize rapid random changes as the cathode glow changes location. Changes in firing and maintaining voltages of the gas tubes can be compensated somewhat by changing the value of the resistor in that particular circuit branch. However, to facilitate freedom of changing probabilities, such compensation could be achieved by utilization of the bias voltage in each circuit branch, such as by the use of a parallel R-C combination in each branch between the toggle element and the positive supply line, for example. The R-C combination should, of course, be of relatively long time constant with respect to the regenerative frequency of oscillation so that the bias voltage will be relatively constant. Or, an adjustable voltage divider can be provided for each circuit branch to allow individual bias adjustment, the resistance of the voltage dividers being small with respect to the resistance means determining the individual branch probabilities. Also, diode clamping can be utilized to compensate for changing lamp characteristics, diode clamping also providing a stabilizing effect in embodiments utilizing tubes or transistors as the toggle elements.

Although the hereinabove illustrated embodiments utilize electrical toggles in which there is no substantial electrical conduction when the toggle is in its inactive state, the toggle being switched between non-conducting and conducting conditions, certain types of nonlinear resistance devices are characterized by significant changes in resistance upon relatively slight alteration of an applied voltage or current, such devices are readily adaptable for use in a ring relaxation oscillator even though there may be significant current conduction when the toggle is in its "inactive" state. Furthermore, electrical toggles characterized by a decrease in resistance upon operation from their "inactive" state to their "indicating" state, can be utilized.

Thus, there has been described various embodiments of digital frequency distribution generator circuits in which the sampling size and expected frequency distribution can be easily altered. The adjustable embodiments of FIGURES 3 and 4 are particularly adapted for taking into account changing strategies or effectiveness in gaming and simulation.

In the hereinabove illustrated embodiments, operation of an electrical toggle to its indicating state results in an increased voltage drop across its associated resistance means, the voltage drop being capacitively coupled to all of the circuit branches to reduce the voltage applied across all of the other electrical toggles in the circuit to maintain them in their inactive state. The charges on the various coupling capacitors vary exponentially in accordance with their particular R-C time constants, the increasing charge on one of the coupling capacitors eventually resulting in an increase in the voltage across another one of the electrical toggles in the circuit to a value sufficient to operate it to its indicating state. Upon such selective switching, the increased voltage drop resulting across the resistance means in that particular circuit branch is coupled by the coupling capacitors to all of the other electrical toggles to thereby selectively operate the previously indicating electrical toggle back to its inactive state and maintain the other electrical toggles in the circuit in their inactive state. Then, the subsequent exponential variation in the charges on the various coupling capacitors subsequently causes yet another electrical toggle in the circuit to be selectively operated to its indicating state, thereby perpetuating a repetitive cycle of sequentially generated digits. The circuit is provided with means for arbitrarily lowering the voltage applied across each of the toggles to randomly interrupt the regenerative cycle while maintaining the then-indicating electrical toggle in its conducting state to provide the desired read-out of a random digit.

Although gas discharge tubes are used as electrical toggles in the illustrated embodiments, and are presently preferred since they are relatively inexpensive and of themselves provide the desired read-out, other types of electrical devices suitable for use as the electrical toggles in ring relaxation oscillators, together with any necessary means for indicating which toggle is in its indicating state at any arbitrary instant of time, will be apparent to those skilled in the art. Typical examples of electrical translating elements commonly used as electrical toggles are cold-cathode gas discharge tubes such as neon glow lamps, thyratrons, diodes, transistors, and vacuum tubes. Electrical toggles can also be formed from a combination of circuit elements, such as for example, an electro-mechanical relay having a resistor wired in series with the relay coil, a set of relay contacts being arranged to short-circuit the resistor upon actuation of the relay.

The illustrated embodiments of circuitry for performing the present invention technique of randomly interrupting a repetitive cycle of sequentially generated digits are ring relaxation oscillators. Other types of circuitry suitable for performance of the present invention technique will become apparent to those skilled in the art. For example, in the case where uniform frequency distribution is desired, an astable multivibrator or other type of free-running oscillator may be used to trigger a ring counter, read-out of the count upon arbitrary interruption of the trigger pulses providing the randomly selected digit. Thus, although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed. For example, diode clamping and diode switching circuitry may be employed to eliminate the need for a multi-ganged switch in the readout technique of FIGURE 1, and to eliminate the requirement for high series resistance and resulting low lamp brightness when reading-out from a low probability circuit branch in the circuit of FIGURE 2. Also, diode circuitry may be utilized to control the probabilities for individual circuit branches, although the hereinabove described techniques involving resistors are simpler and more flexible. As another example, circuit modifications are possible that would permit an analogue type of read-out, such as an ammeter.

What is claimed is:

1. Electrical apparatus for generating signals representative of digits selected randomly from a sampling size of $n$ possible digits and a predetermined expected frequency distribution, said apparatus comprising, in combination: a multi-branch oscillator circuit consisting of $n$ shunt-connected circuit branches which are adapted to present first and second states, said circuit branches being intercoupled in a regenerative ring wherein each circuit branch is periodically operated from its first state to its second state for a predetermined time to provide the manifestation of a predetermined digit, said circuit branches being so periodically actuated in a continuous sequence with a predetermined relative frequency of occurrence; and, means for halting the repetitive cycle of sequential operation at an arbitrary instant of time, whereby the particular circuit branch then in said second state provides an indication of a randomly selected digit.

2. Electrical apparatus for generating signals representative of digits selected randomly from a sampling size of $n$ possible digits and a predetermined expected frequency distribution, said apparatus comprising, in combination: a relaxation oscillator circuit consisting of $n$ shunt-connected circuit branches, each circuit branch including an electrical toggle adapted to be electrically operated between inactive and indicating states, said circuit branches being electrically intercoupled in a regenerative ring wherein each electrical toggle is periodically operated from its inactive state to its indicating state for a predetermined time to provide the manifestation of a predetermined digit, said electrical toggles being so periodically actuated in a continuous sequence with a predetermined relative frequency of occurrence; and, means for halting the repetitive cycle of sequential toggle operation at an arbitrary instant of time, whereby the particular electrical toggle then in its indicating state provides an indication of a randomly selected digit.

3. Electrical apparatus for generating signals representative of digits selected randomly from a sampling size of $n$ possible digits and a predetermined expected frequency distribution, said apparatus comprising, in combination: a relaxation oscillator circuit consisting of $n$ shunt-connected circuit branches, each circuit branch including an electrical toggle adapted to be electrically operated between inactive and indicating states, said circuit branches being capacitively intercoupled in a regenerative ring wherein each electrical toggle is periodically operated by an electrical relaxation effect from its inactive state to its indicating state for a predetermined time to provide the manifestation of a predetermined digit, said electrical toggles being so periodically actuated in a continuous sequence with a predetermined relative frequency of occurrence; and, means for halting the repetitive cycle of sequential toggle operation at an arbitrary instant of time, whereby the particular electrical toggle then in its indicating state provides an indication of a randomly selected digit.

4. Electrical apparatus for generating signals representative of digits selected randomly from a sampling size of $n$ possible digits and a predetermined expected frequency distribution, said apparatus comprising, in combination: a relaxation oscillator circuit consisting of $n$ shunt-connected circuit branches, each circuit branch comprising the series combination of an electrical toggle and resistance means, said electrical toggles being adapted to be electrically operated between inactive and indicating states, said circuit branches being intercoupled in a regenerative ring by capacitance means connected to the junction between the electrical toggle and the resistance means of each circuit branch so that each electrical toggle is periodically operated by an electrical relaxation effect from its inactive state to its indicating state for a predetermined time to provide the manifestation of a predetermined digital result, the periodic actuation of said electrical toggles being in a continuous sequence with a predetermined relative frequency of occurrence; and, means for halting the repetitive cycle of sequential toggle operation at an arbitrary instant of time, whereby the particular electrical toggle then in its indicating state provides an indication of a randomly selected digit.

5. Electrical apparatus for generating signals representative of digits selected randomly from a sampling size of $n$ possible digits and a predetermined expected frequency distribution, said apparatus comprising, in combination: a relaxation oscillator circuit consisting of $n$ shunt-connected circuit branches electrically coupled to a source of direct current operating potential, each circuit branch comprising the series combination of a gas discharge tube and resistance means, all of said gas discharge tubes having substantially identical firing potentials and operating potentials, the voltage output of said source of direct current potential being in excess of the firing potential of said gas discharge tubes, said circuit branches being intercoupled in a regenerative ring by capacitance means connected to the junction between the gas discharge tube and the resistance means in each circuit branch so that a potential at least equal to the tube firing potential is periodically applied to each gas discharge tube by an electrical relaxation effect to operate the gas discharge tube from its non-conducting state to its conducting state for a predetermined time to provide the manifestation of a predetermined digital result, the periodic firing of said gas discharge tubes being in a continuous sequence with a predetermined relative frequency of occurrence, the resistance value of the resistance means in each of said circuit branches being determined in accordance with the following relationship:

$$P_1 = \frac{1/R_1}{1/R_1 + 1/R_2 + \cdots 1/R_n}$$

where the subscripts identify the particular circuit branch and $P$=probability and $R$=resistance; and, means for lowering the voltage applied to all of the gas discharge tubes in the circuit to the tube operating potential at an arbitrary instant of time to thereby halt the repetitive cycle of sequential gas discharge tube operation, whereby the particular gas discharge tube then in its conducting state provides an indication of a randomly selected digit.

References Cited by the Examiner

UNITED STATES PATENTS 2,175,892 10/1939 Greene ---------------- 35—39

NEIL C. READ, *Primary Examiner.*

H. I. PITTS, *Assistant Examiner.*